United States Patent
Kuwahara et al.

(10) Patent No.: US 8,429,979 B2
(45) Date of Patent: Apr. 30, 2013

(54) CAPACITANCE TYPE PRESSURE SENSOR

(75) Inventors: Akira Kuwahara, Kyoto (JP); Takehisa Hataita, Kyoto (JP); Soutaro Kishida, Kyoto (JP)

(73) Assignee: Horiba STEC, Co., Ltd., Kyoto-shi (JP)

( * ) Notice: Subject to any disclaimer, the term of this patent is extended or adjusted under 35 U.S.C. 154(b) by 208 days.

(21) Appl. No.: 13/115,361

(22) Filed: May 25, 2011

(65) Prior Publication Data
US 2011/0290031 A1    Dec. 1, 2011

(30) Foreign Application Priority Data

May 25, 2010  (JP) .................................. 2010-119756
Apr. 15, 2011  (JP) .................................. 2011-091496

(51) Int. Cl.
*G01L 9/12*    (2006.01)
(52) U.S. Cl.
USPC ............... 73/724; 73/715; 73/718; 361/283.4
(58) Field of Classification Search ........................ None
See application file for complete search history.

(56) References Cited

U.S. PATENT DOCUMENTS

| 4,196,632 | A | * | 4/1980 | Sikorra ............................ 73/718 |
| 4,703,658 | A | * | 11/1987 | Mrozack et al. ................. 73/724 |
| 5,157,972 | A | * | 10/1992 | Broden et al. ................... 73/718 |
| 6,612,177 | B2 | * | 9/2003 | Boehler et al. .................. 73/715 |

FOREIGN PATENT DOCUMENTS

JP        2009-300336 A    12/2009

* cited by examiner

*Primary Examiner* — Andre Allen
*Assistant Examiner* — Jermaine Jenkins
(74) *Attorney, Agent, or Firm* — Alleman Hall McCoy Russell & Tuttle LLP

(57) ABSTRACT

The present invention is adapted to prevent a diaphragm from being deformed by a thermal stress caused by thermal expansion coefficients of a sensor main unit and a fixing member and includes a sensor main unit to which a fixed electrode is fixed, a diaphragm structure that forms a sealed space between the diaphragm structure and the sensor main unit and a fixing member that is jointed to the diaphragm structure in a manner of surrounding a pressure receiving part of the diaphragm structure so as to lead a fluid to the pressure receiving part, wherein the diaphragm structure includes a flat plane diaphragm main unit and first and second ring members each having a known thermal expansion coefficient that are respectively provided on both sides of a circumference of the diaphragm main unit.

3 Claims, 3 Drawing Sheets

CAPACITANCE TYPE PRESSURE SENSOR

TECHNICAL FIELD

The present invention relates to a capacitance type pressure sensor for measuring a pressure by detecting a change of a capacitance between a diaphragm which is displaced by the pressure and a fixed electrode.

BACKGROUND ART

As a capacitance type pressure sensor of this kind, for example, as disclosed in Japanese Published Patent App. No. JP2009-300336A and shown in FIG. 3, a diaphragm is jointed by welding to a periphery of an opening of a recessed portion formed in one end of a sensor main unit to which a fixed electrode is fixed by a sealing glass.

Although not shown in Japanese Published Patent App. No. JP2009-300336A, as shown in FIG. 3, a flange part, which is attached to a flow path forming member for forming a flow path to be measured so as to lead a fluid to a pressure receiving surface, is jointed by welding to a circumference of a side of the pressure receiving surface of the diaphragm that is welded to the sensor main unit. In the capacitance type pressure sensor as configured above, a fluid flows into a side of the diaphragm through an introduction port provided in the flange part so that the diaphragm is displaced by a pressure of the fluid.

However, in the capacitance type pressure sensor as constructed above, when the diaphragm is welded to the sensor main unit, there is a problem that, expansion amounts of the sensor main unit and the diaphragm are different because thermal expansion coefficients of the sensor main unit and the diaphragm are different and, therefore, there arises a deformation due to a thermal stress caused between the diaphragm and the sensor main unit after welding. Herein, although it may be considered to execute the welding taking into consideration the thermal expansion coefficients of both the sensor main unit and the diaphragm, the thermal expansion coefficient of the sensor main unit is not univocally defined since the sensor main unit is an assembly of the fixed electrode, sealing glass and the like, while the thermal expansion coefficient of the diaphragm is known because the diaphragm is made of a simple substance. Therefore, it is extremely difficult to execute the welding taking into consideration the thermal coefficients of both the sensor main unit and the diaphragm at the time of welding.

Further, similarly, in the case of welding the flange part to the diaphragm previously welded to the sensor main unit, there is a problem that there arises a deformation due to a thermal stress caused between the diaphragm and the flange part because the thermal expansion coefficients of the diaphragm and the flange part are different. Also, in this case, although it may be considered to execute the welding taking into consideration the thermal expansion coefficients of both the diaphragm and the flange part, the thermal expansion coefficient of the diaphragm welded to the sensor main unit is different from the thermal expansion coefficient of the diaphragm of the simple substance per se. Therefore, it is extremely difficult to execute the welding taking into consideration the thermal coefficients of both the diaphragm and the flange part at the time of welding.

In the above description, although the explanation is made as to the case where the flange part is welded to the diaphragm after the diaphragm is welded to the sensor main unit, there is a similar problem also in the case where the sensor main unit is welded to the diaphragm after the diaphragm is welded to the flange part.

SUMMARY OF THE INVENTION

Technical Problem

Accordingly, the present invention has been made to solve the problems mentioned above and an essential object thereof is to prevent a diaphragm from being deformed due to a thermal stress caused by different thermal expansion coefficients of a sensor main unit and a fixing member.

Solution to the Problem

A capacitance type pressure sensor according to the present invention is adapted to measure a pressure by detecting a change of a capacitance between a diaphragm that is displaced by the pressure and a fixed electrode. The capacitance type pressure sensor includes: a sensor main unit to which the fixed electrode is fixed so as to be exposed to one end side of the sensor main unit; a diaphragm structure jointed to one end side of the sensor main unit so as to form a sealed space between the diaphragm structure and the sensor main unit; and a fixing member that is jointed to the diaphragm structure in a manner of surrounding a pressure receiving part of the diaphragm structure and is attached to a flow path forming member for forming a flow path to be measured so as to lead a fluid to the pressure receiving part. Herein the diaphragm structure includes: a flat plane diaphragm main unit for forming the diaphragm; a first ring member having a known thermal expansion coefficient that is jointed to a circumference of the electrode side in the diaphragm main unit and is connected to one end side of the sensor main unit; and a second ring member having a known thermal expansion coefficient that is jointed to a circumference of the pressure receiving side in the diaphragm main unit and is connected to the fixing member.

With this configuration, since the diaphragm main unit forming the diaphragm is jointed to the sensor main unit via the first ring member having a known thermal expansion coefficient, a thermal stress caused in the diaphragm due to the thermal expansion coefficient of the sensor main unit can be reduced. Further, since the diaphragm main unit is jointed to the fixing member via the second ring member having a known thermal expansion coefficient, a thermal stress caused in the diaphragm due to the thermal expansion coefficient of the fixing member can be reduced. Therefore, the diaphragm can be prevented from being deformed by the thermal stresses caused by the thermal expansion coefficients of the sensor main unit and the fixing member. Moreover, since the diaphragm main unit is jointed to the first ring member and the second ring member having the known thermal expansion coefficients, it becomes possible to give a desired tensile force to the diaphragm. Moreover, although it becomes more difficult to directly weld the diaphragm main unit to the sensor main unit and the fixing member as the diaphragm becomes thinner, the sensor can be easily assembled by, for example, jointing the diaphragm structure to the sensor main unit and the fixing member after the diaphragm is manufactured by jointing the first ring member and the second ring member to the diaphragm. At this time, a strength of the diaphragm structure can be increased by jointing the first ring member and the second ring member to the diaphragm main unit so that the jointing can be executed while suppressing a deformation of the diaphragm main unit.

Since the thermal expansion coefficients of the first ring member and the second ring member are known, in order to positively take advantage of a difference from the thermal expansion coefficient of the diaphragm main unit so that a measurement range or a measurement precision of the capacitance type pressure sensor is adjustable, it is desirable that the tensile force of the diaphragm is adjusted by the thermal expansion coefficients of the first ring member and the second ring member and the thermal expansion coefficient of the diaphragm main unit. That is, the sensor is adapted to have a measurement range to be made variable by the thermal expansion coefficients of the first ring member and the second ring member and the thermal expansion coefficient of the diaphragm main unit.

For example, by making the thermal expansion coefficients of the first ring member and the second ring member lower than that of the diaphragm main unit, the tensile force of the diaphragm can be made large at the time of assembling so that the measurement range of the sensor can be increased. On the other hand, by making the thermal expansion coefficients of the first ring member and the second ring member higher than that of the diaphragm main unit, the tensile force of the diaphragm can be made small at the time of assembling so that the measurement range of the sensor can be reduced (or the measurement precision can be made high).

If the thermal expansion coefficients of the first ring member and the second ring member are substantially the same, the deformation caused in the diaphragm main unit can be reduced as much as possible irrespective of the thermal expansion coefficient of the sensor main unit or the thermal expansion coefficient of the fixing member.

Advantageous Effects of the Invention

According to the present invention constructed as mentioned above, the diaphragm can be prevented from being deformed due to a thermal stress that is caused by the thermal expansion coefficient of the sensor main unit and the thermal expansion coefficient of the fixing member.

DETAILED DESCRIPTION OF THE EMBODIMENTS

An embodiment of a capacitance type pressure sensor according to the present invention is described below referring to the accompanying drawings.

A capacitance type pressure sensor 100 of the present embodiment is a capacitance type diaphragm vacuum gauge corresponding to an absolute pressure gauging type of a total pressure vacuum gauge that is adapted to detect a capacitance between a diaphragm which is displaced by a pressure and a fixed electrode 21 so that a displacement amount of the diaphragm is converted to a value of the pressure to be measured. It is noted here that the capacitance to be converted to the pressure is inversely proportional to a distance between the diaphragm and the fixed electrode 21.

Figure 1:
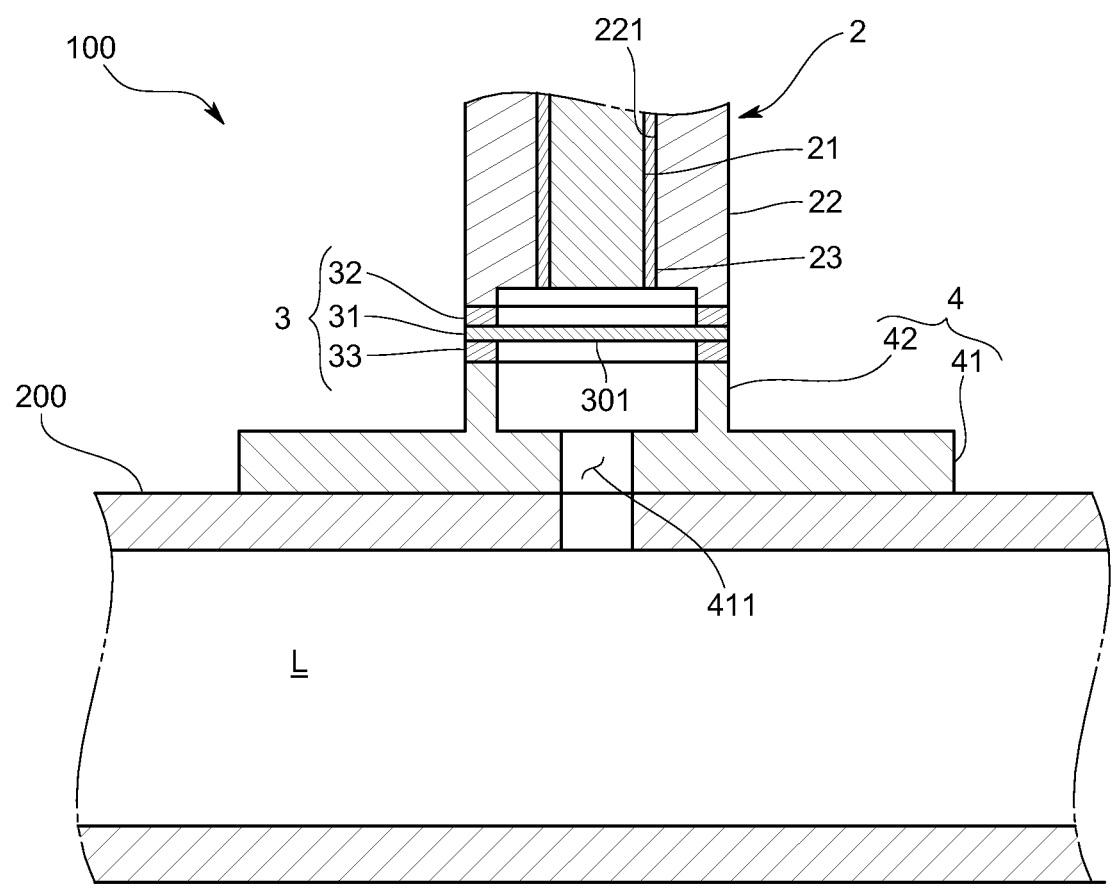
FIG. 1 is a sectional view showing a schematic configuration of a capacitance type pressure sensor according to one embodiment of the present invention.

Specifically, as shown in FIG. 1, the capacitance type pressure sensor 100 includes a sensor main unit 2, a diaphragm structure 3 jointed to the sensor main unit 2 and a fixing member 4 jointed to the diaphragm structure 3.

The sensor main unit 2 includes: a fixed electrode 21 which is fixed so as to be exposed at a lower end portion of one end side of the sensor main unit 2; a main body 22 to which the fixed electrode 21 is inserted and fixed; and a sealing member 23 such as a sealing glass which is interposed between the fixed electrode 21 and the main body 22 for air-tightly sealing both of them so that the fixed electrode 21 is fixed to the main body 22. The main body 22 is formed of a corrosion-proof stainless steel.

The fixed electrode 21 is formed of a conductor including a metal such as gold, platinum, titanium or the like which is not easily corroded. The fixed electrode 21 of the present embodiment has a generally column shape since it is inserted into an electrode fixing hole 221 formed in the main body 22. A lead wire (not shown) is connected to a rear end of the fixed electrode 21 for detecting a change of a capacitance. This lead wire is connected to an output terminal provided on, e.g., an upper portion of the sensor main unit 2. Herein, this output terminal is connected to an operation part (not shown) for converting a changed amount of a capacitance to a pressure signal.

The diaphragm structure 3 is jointed to a lower end portion of one end side of the sensor main unit 2 so as to form an enclosed space between the sensor main unit 2 and the diaphragm structure 3.

Figure 2:
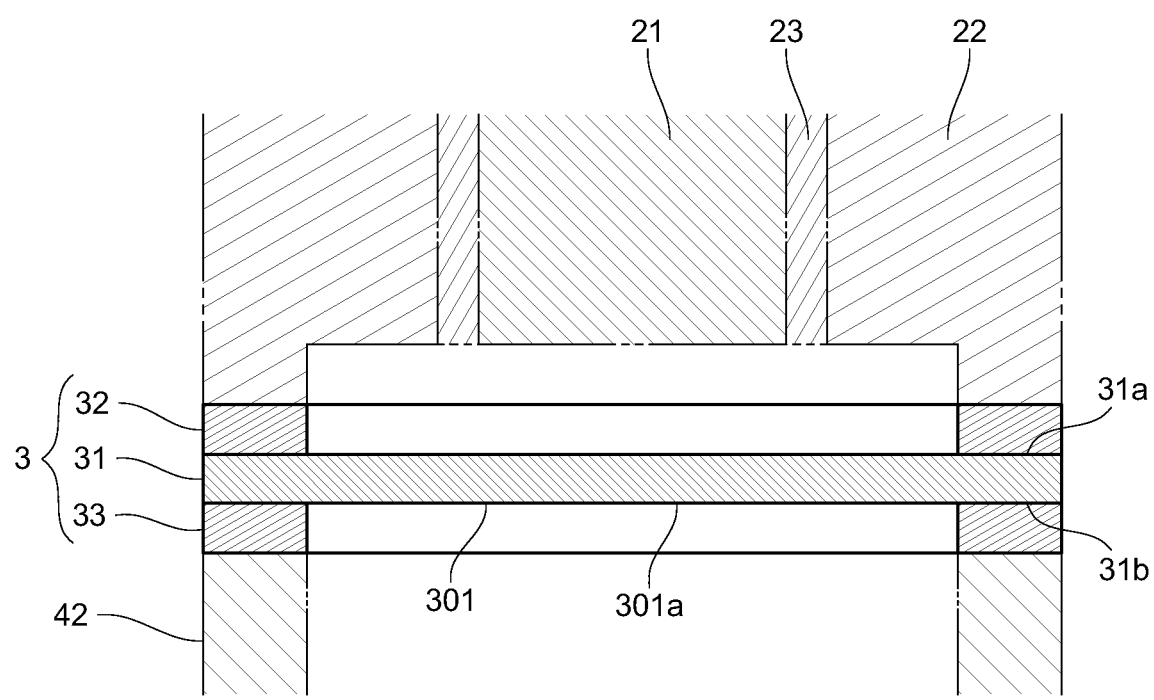
FIG. 2 is a sectional view mainly showing a diaphragm structure of the same embodiment.
Figure 3:
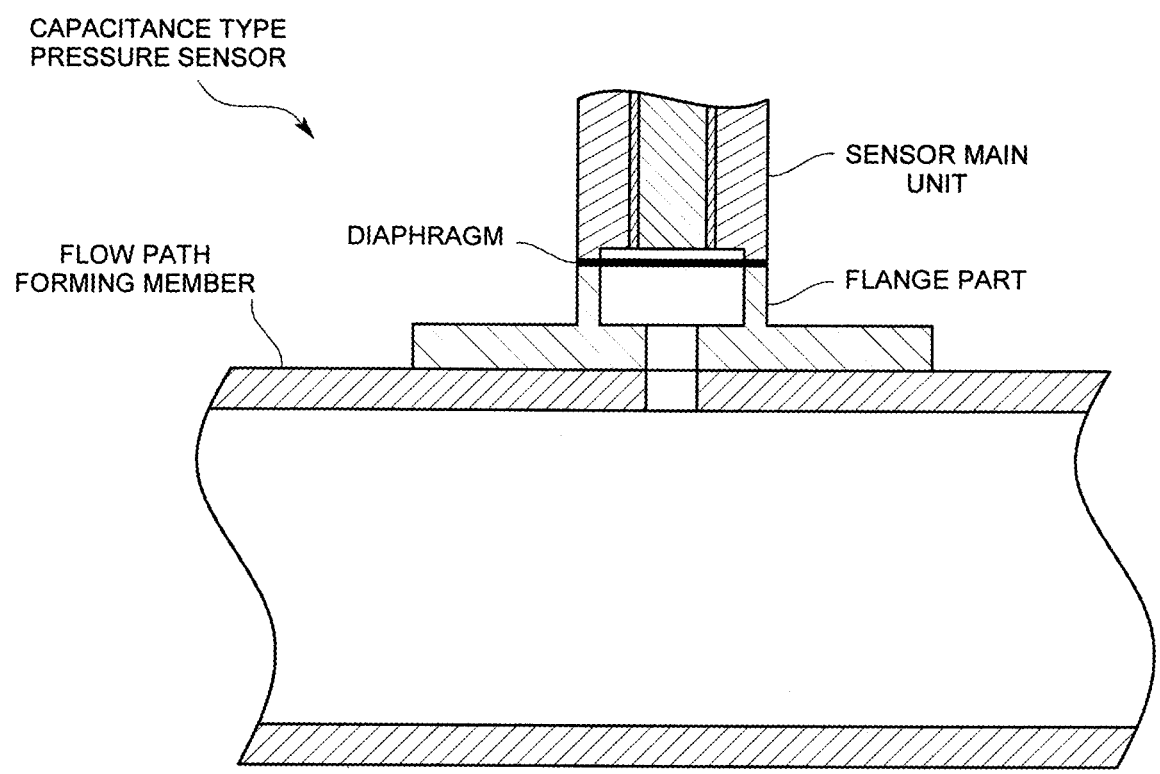
FIG. 3 is a sectional view showing a schematic configuration of a conventional capacitance type pressure sensor.

Specifically, as shown in FIG. 2, the diaphragm structure 3 includes a flat-shaped diaphragm main unit 31 which forms a diaphragm 301, a first ring member 32 provided on an electrode side circumference 31a of the diaphragm main unit 31 and a second ring member 33 provided on a pressure-receiving side circumference 31b of the diaphragm main unit 31.

The diaphragm main unit 31 has a disc shape and constitutes a capacitor along with one end plane which is an end plane of the of the fixed electrode 21 facing to a side of the diaphragm 301. The diaphragm main unit 31 is elastically deformed by a minute change of an external pressure and is formed of a thin metal plate having a high corrosion resistance and a heat resistance property. The diaphragm main unit 31 is a thin plate including a nickel-cobalt alloy containing nickel and cobalt as main components and other components such as tungsten, molybdenum, titanium, chromium and the like. A thickness of the film is, e.g., several tens of microns ($\mu$m) in order to increase a sensitivity with respect to a change of an external pressure. It is noted here that the diaphragm main unit 31 may be a thin plate including a nickel alloy containing nickel as a main component and other components such as iron, chromium, niobium and the like.

The first ring member 32 is provided concentrically with the diaphragm main unit 31 on the electrode side circumference 31a of the diaphragm main unit 31 and has an annular shape having an outer diameter generally equal to that of the diaphragm main unit 31. One end plane (i.e., lower surface in FIG. 2) of the first ring member 32 is jointed by welding to the electrode side circumference 31a of the diaphragm main unit 31. Another end plane (i.e., upper surface in FIG. 2) of the first ring member 32 opposite to the plane jointed to the diaphragm main unit 31 is jointed by welding to a circumference of one end plane of the main body 22 of the sensor main unit 2 concentrically with the fixed electrode 21. The first ring member 32 is formed of a conductive metal having high corrosion resistance and heat resistance properties and having a known thermal expansion coefficient. In the present embodiment, the first ring member 32 is formed of a nickel alloy containing nickel as a main component and other components such as iron, chromium, niobium and the like.

The second ring member 33 is provided concentrically with the diaphragm main unit 31 on the pressure-receiving side circumference 31b of the diaphragm main unit 31 and has an annular shape having an outer diameter generally equal to that of the diaphragm main unit 31. One end plane (i.e., upper surface in FIG. 2) of the second ring member 33 is jointed by welding to the pressure-receiving side circumference 31b of the diaphragm main unit 31. Another end plane (i.e., lower surface in FIG. 2) of the second ring member 33 opposite to the plane jointed to the diaphragm main unit 31 is jointed by welding to an end plane of a cylindrical part 42 of the fixing member 4. Similarly to the first ring member 32, the second ring member 33 is formed of a conductive metal having high corrosion resistance and heat resistance properties and having a known thermal expansion coefficient. In the present embodiment, the second ring member 33 is formed of a nickel alloy containing nickel as a main component and other components such as iron, chromium, niobium and the like.

The fixing member 4 is provided in a manner of surrounding a pressure-receiving portion (i.e., pressure-receiving surface 301a of the diaphragm 301) of the diaphragm structure 3 and is attached to a flow path forming member 200 for forming a flow path L of measurement-targeted flow so as to introduce a fluid to the pressure-receiving portion 301a. The fixing member 4 includes a flange part 41 which is fixed to the flow path forming member 200 and which has a communicating path 411 formed to be communicated with the measurement-targeted flow path L and further includes a cylindrical part 42 which is formed in a manner of surrounding an aperture of the communicating path 411 of the flange part 41. The second ring member 33 is jointed by welding to an upper end surface of the cylindrical part 42. Herein, the fixing member 4 is formed of a stainless steel having corrosion resistance and heat resistance properties.

In this configuration of the capacitance type pressure sensor 100 of the present embodiment, the thermal expansion coefficients of the sensor main unit 2 and the fixing member 4 are different from that of the diaphragm main unit 31 and the thermal expansion coefficient of the first ring member 32 is the same as that of the second ring member 33. In particular, the first ring member 32 and the second ring member 33 are made of the same material so that the both ring members have the same thermal expansion coefficient.

The thermal (linear) expansion coefficient of the sensor main unit 2 is considered to be approximately $16 \times 10^{-6}$ [1/° C.] because the main material thereof is stainless steel. Similarly, the thermal (linear) expansion coefficient of the fixing member 4 is approximately $16 \times 10^{-6}$ [1/° C.]. Further, the thermal (linear) expansion coefficient of the diaphragm main unit 31 is approximately $12 \times 10^{-6}$ [1/° C.] because the material thereof is nickel-cobalt alloy. Further, the thermal (linear) expansion coefficients of the first ring member 32 and the second ring member 33 are approximately $11.5 \times 10^{-6}$ [1/° C.] because the material thereof is nickel alloy. Thus, the thermal expansion coefficients of the first ring member 32 and the second ring member 33 are made closer to the thermal expansion coefficient of the diaphragm main unit 31 than the thermal expansion coefficients of the sensor main unit 2 and the fixing member 4, so that a thermal stress, which is possibly caused due to the thermal expansion coefficient of the diaphragm main unit 31 being different from the thermal expansion coefficients of the sensor main unit 2 and the fixing member 4, can be reduced as small as possible.

Finally, an example of a method of assembling the capacitance type pressure sensor 100 is briefly described below.

Initially, the fixed electrode 21 together with the cylindrical glass member 23 is inserted to the electrode fixing hole 221 formed in the main body 22. Then, the glass member 23 and the fixed electrode 21 are fixed to the main body 22 using a jig (not shown) and the glass member 23 is heated and melted in a furnace so that the fixed electrode 21 is fixed to the main body 22 by glass fusion.

Meanwhile, the first ring member 32 and the second ring member 33 are respectively concentrically welded by such as laser welding, electron beam welding or arc welding to one surface and the other surface of the disc shaped diaphragm main unit 31 obtained by cutting a thin metal plate formed by a rolling process so as to form the diaphragm structure 3. At this time, since the thermal expansion coefficients of the first ring member 32 and the second ring member 33 to be welded to the diaphragm main unit 31 are known, it is possible to execute the welding in consideration of the corresponding thermal expansion coefficients so that a deformation of the diaphragm 301 can be reduced and the diaphragm 301 can be also adjusted to have a desired tensile force.

In addition to adjusting the tensile force of the diaphragm 301 based on a difference in thermal expansion coefficients between the diaphragm main unit 31, the first ring member 32 and the second ring member 33, the diaphragm main unit 31 is heated and expanded by a heat source such as a halogen lamp separately provided at a time of welding the first ring member 32 and the second ring member 33 to the diaphragm main unit 31 so that the thermal expansion amounts of the first ring member 32 and the second ring member 33 and the diaphragm main unit 31 at the time of jointing can be also adjusted so as to be able to adjust the tensile force of the diaphragm 301 after jointing.

Thereafter, the first ring member 32 of the diaphragm structure 3 is jointed by welding such as laser welding, electron beam welding or arc welding to one end side of the sensor main unit 2. Further, the second ring member 33 of the diaphragm structure 3 is jointed by welding such as laser welding, electron beam welding or arc welding to the cylindrical part 42 of the fixing member 4. Thus, the capacitance type pressure sensor 100 can be assembled.

Effect of the Present Embodiment

According to the capacitance type pressure sensor 100 of the present embodiment as configured above, since the diaphragm main unit 31 constituting the diaphragm 301 is jointed to the sensor main unit 2 via the first ring member 32 having a known thermal expansion coefficient, a thermal stress caused in the diaphragm main unit 31 due to the thermal expansion coefficient of the sensor main unit 2 can be reduced. Further, since the diaphragm main unit 31 is connected to the fixing member 4 via the second ring member 33 having a known thermal expansion coefficient, a thermal stress caused in the diaphragm main unit 31 due to the thermal expansion coefficient of the fixing member 4 can be reduced. Thus, the diaphragm 301 can be prevented from being deformed by a thermal stress caused by the thermal expansion coefficients of the sensor main unit 2 and the fixing member 4. Further, since the diaphragm main unit 31 is jointed to the first ring member 32 and the second ring member 33 each having a known thermal expansion coefficient, a desired tensile force can be given to the diaphragm 301. Moreover, although it becomes more difficult to directly weld the diaphragm main unit 31 to the sensor main unit 2 and the fixing member 4 as the diaphragm 301 becomes thinner, the assembly of the sensor 100 can be facilitated by adaptation of sandwiching the diaphragm 301 between the first second ring member 32 and the second ring member 33.

Other Modified Examples

It is noted that the present invention is not limited to the above embodiment and various modifications can be considered as follows.

For example, in the capacitance type pressure sensor 100 of the present embodiment described above, although the main body 22 of the sensor main unit 2, the first ring member 32, the second ring member 33, the diaphragm main unit 31 and the fixing member 4 are respectively made of different materials, these may be entirely formed of a common material (e.g., stainless steel). Also, in this case, since the diaphragm main unit 31 is jointed to the first ring member 32 and the second ring member 33, it is not necessary to consider the thermal expansion coefficient of the sensor main unit 2 and the deformation given to the diaphragm by the sensor main unit 2 can be reduced.

Further, by appropriately selecting the thermal expansion coefficients of the first ring member 32 and the second ring member 33 and the thermal expansion coefficient of the diaphragm main unit 31, the tensile force of the diaphragm including the diaphragm main unit 31 can be also adjusted. By selecting the thermal expansion coefficients of the first ring member 32 and the second ring member 33 to be larger than that of the diaphragm main unit 31, the tensile force of the diaphragm can be reduced so that the measurement range can be made smaller (i.e., the sensitivity can be made higher). On the other hand, by selecting the thermal expansion coefficients of the first ring member 32 and the second ring member 33 to be smaller than that of the diaphragm main unit 31, the tensile force of the diaphragm can be increased so that the measurement range can be made larger.

Further, in the assembling method of the present embodiment described above, although the diaphragm structure 3 is welded to the sensor main unit 2 after the diaphragm structure 3 is assembled, it may be configured in a manner that, the diaphragm main unit 31 is welded to the first ring member 32 after the first ring member 32 is welded to the sensor main unit 2 and thereafter the second ring member 33 is welded to the diaphragm main unit 31 and then the fixing member 4 is welded to the second ring member 33. Also, it may be configured in a manner that, the diaphragm main unit 31 is welded to the second ring member 33 after the second ring member 33 is welded to the fixing member 4 and thereafter the first ring member 32 is welded to the diaphragm main unit 31 and then the sensor main unit 2 is welded to the first ring member 32.

Moreover, it may be also considered that the thermal expansion coefficient of the first ring member is set to an intermediate value between the thermal expansion coefficient of the sensor main unit and the thermal expansion coefficient of the diaphragm main unit. With this configuration, the deformation of the diaphragm caused due to a difference between the thermal expansion coefficient of the sensor main unit and the thermal expansion coefficient of the diaphragm main unit can be reduced as small as possible. Similarly, in order to reduce the deformation of the diaphragm caused due to a difference between the thermal expansion coefficient of the fixing member and the thermal expansion coefficient of the diaphragm main unit to be as small as possible, it may be considered that the thermal expansion coefficient of the second ring member is set to an intermediate value between the thermal expansion coefficient of the fixing member and the thermal expansion coefficient of the diaphragm main unit.

In the present embodiment described above, although the thermal expansion coefficient of the diaphragm main unit is different from the coefficients of the first ring member and the second ring member, the thermal expansion coefficient of the diaphragm main unit may be made generally equal to the coefficients of the first ring member and the second ring member. With this configuration, temperature effects of the diaphragm main unit and the first ring member and the second ring member are generally the same so that a distortion caused by a thermal stress that the diaphragm main unit undergoes from the first ring member and the second ring member can be reduced as small as possible. Thus, the measurement precision of the sensor can be improved.

In addition, it is needless to say that the present invention is not limited to the embodiments described above and various changes and modifications thereof can be made within a range unless it departs from the spirit of the present invention.

REFERENCE CHARACTERS LIST

100 . . . Capacitance type pressure sensor
2 . . . Sensor main unit
21 . . . Fixed electrode
3 . . . Diaphragm structure
301 . . . Diaphragm
31 . . . Diaphragm main unit
32 . . . First ring member
33 . . . Second ring member
4 . . . Fixing member
L . . . Flow path to be measured
5 . . . Flow path forming member

The invention claimed is:

1. A capacitance type pressure sensor adapted to measure a pressure by detecting a change of a capacitance between a diaphragm that is displaced by the pressure and a fixed electrode, comprising:
    a sensor main unit to which the fixed electrode is fixed so as to be exposed to one end side thereof;
    a diaphragm structure jointed to one end side of the sensor main unit so as to form a sealed space between the diaphragm structure and the sensor main unit; and
    a fixing member that is jointed to the diaphragm structure in a manner of surrounding a pressure receiving part of the diaphragm structure and is attached to a flow path forming member for forming a flow path to be measured so as to lead a fluid to the pressure receiving part,
    wherein the diaphragm structure comprises:
        a flat plane diaphragm main unit for forming the diaphragm;
        a first ring member having a known thermal expansion coefficient that is jointed to an electrode side circumference in the diaphragm main unit and is connected to one end side of the sensor main unit; and
        a second ring member having a known thermal expansion coefficient that is jointed to a pressure receiving side circumference in the diaphragm main unit and is connected to the fixing member.

2. The capacitance type pressure sensor according to claim 1, wherein a tensile force of the diaphragm is adjusted by the thermal expansion coefficients of the first ring member and the second ring member and the thermal expansion coefficient of the diaphragm main unit.

3. The capacitance type pressure sensor according to claim 1, wherein the thermal expansion coefficients of the first ring member and the second ring member are substantially the same.

* * * * *